(12) United States Patent
Takasu et al.

(10) Patent No.: US 9,423,614 B2
(45) Date of Patent: Aug. 23, 2016

(54) HEAD-UP DISPLAY DEVICE

(71) Applicant: YAZAKI CORPORATION, Tokyo (JP)

(72) Inventors: Katsutoshi Takasu, Shizuoka (JP); Akira Masuda, Shizuoka (JP); Takeshi Iwamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 8 days.

(21) Appl. No.: 14/326,155

(22) Filed: Jul. 8, 2014

(65) Prior Publication Data
US 2015/0015964 A1    Jan. 15, 2015

(30) Foreign Application Priority Data

Jul. 10, 2013   (JP) ................. 2013-144888

(51) Int. Cl.
*G02B 27/00* (2006.01)
*G02B 27/01* (2006.01)

(52) U.S. Cl.
CPC .... *G02B 27/0101* (2013.01); *G02B 2027/0141* (2013.01)

(58) Field of Classification Search
CPC .............. G02B 27/0101; G02B 27/01; G02B 2027/014; G02B 2027/0141; G02B 6/00; G09G 3/3406; G09G 3/36; B60K 37/02; B60Q 3/024

USPC .......... 359/630–632, 637, 639, 640; 345/7, 9; 340/456
See application file for complete search history.

(56) References Cited

U.S. PATENT DOCUMENTS

| | | | |
|---|---|---|---|
| 2004/0201465 A1* | 10/2004 | Meyer | F16H 63/42 340/438 |
| 2012/0075708 A1* | 3/2012 | Hagiwara | B60K 35/00 359/630 |
| 2013/0083039 A1* | 4/2013 | Chiang | G02B 27/01 345/501 |

FOREIGN PATENT DOCUMENTS

JP     2006-11122 A    1/2006

* cited by examiner

*Primary Examiner* — Scott J Sugarman
*Assistant Examiner* — Gary O'Neill
(74) *Attorney, Agent, or Firm* — Kenealy Vaidya LLP

(57) ABSTRACT

Emitted light from first light sources cause a pair of first guide lights to be displayed on a combiner side by side at positions adjacent to a HUD display area. Emitted light from second light sources cause a pair of second guide lights to be displayed such that the pair of first guide lights are interposed between the pair of second guide lights. At least one of number of light sources to be lit, lighting cycle, and lighting order of the first and the second light sources is changed in accordance with a current vehicle speed and a change in shift position of a transmission of a vehicle.

2 Claims, 13 Drawing Sheets

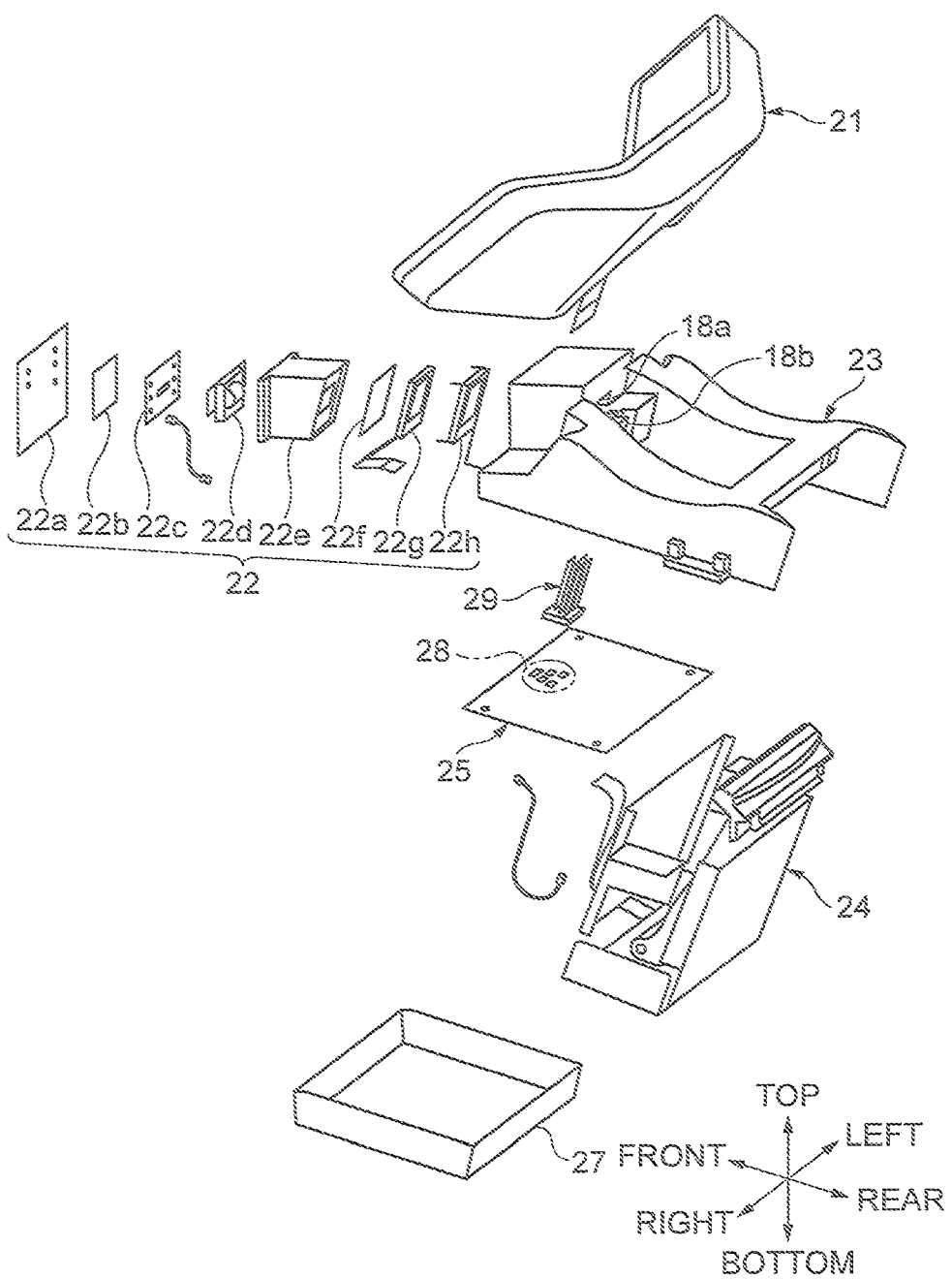

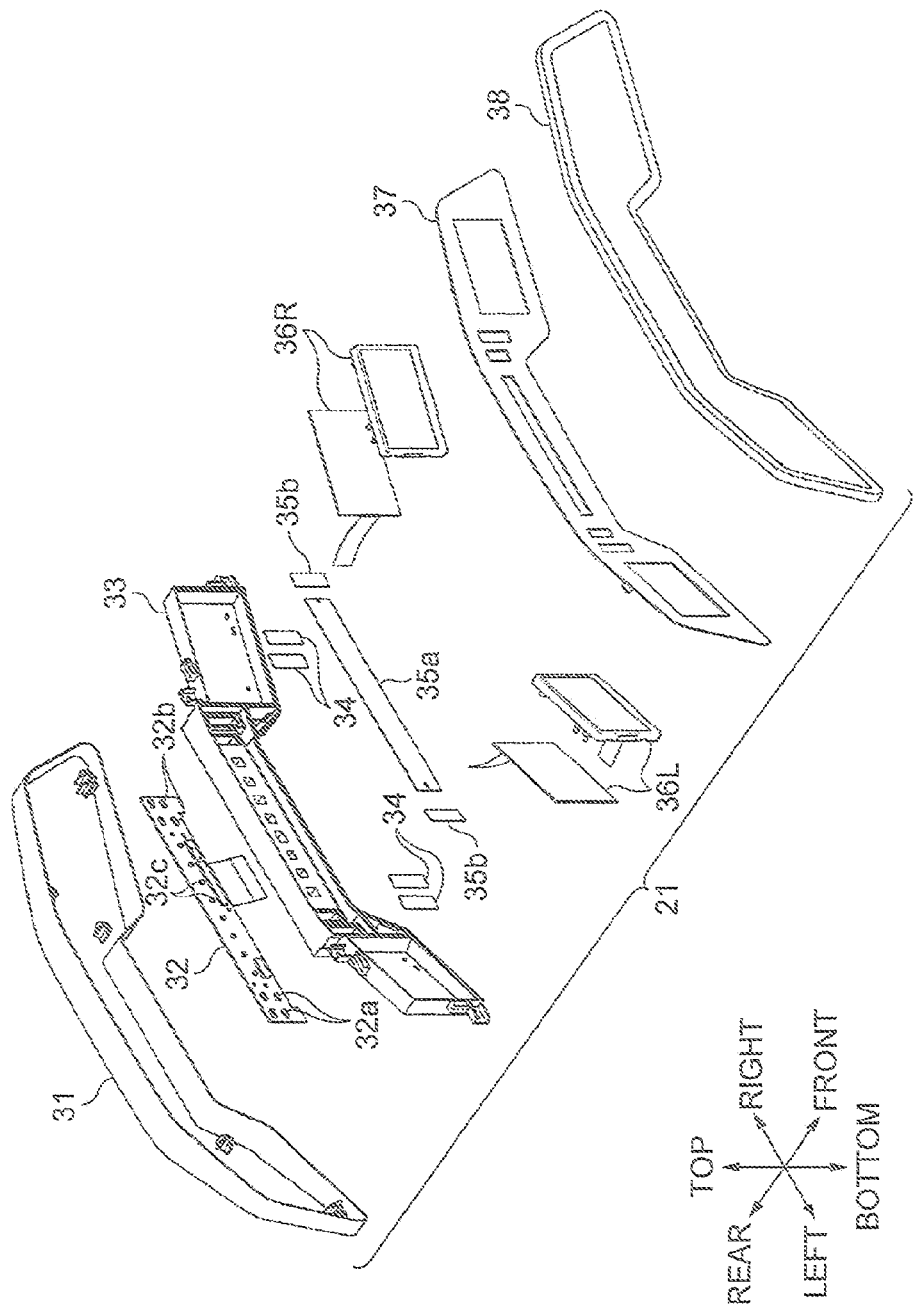

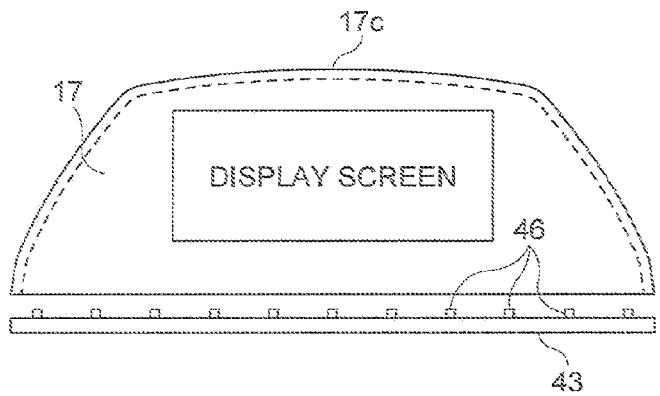
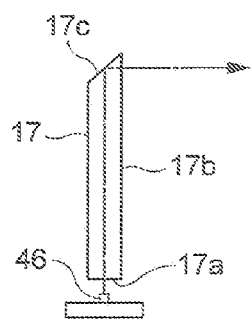
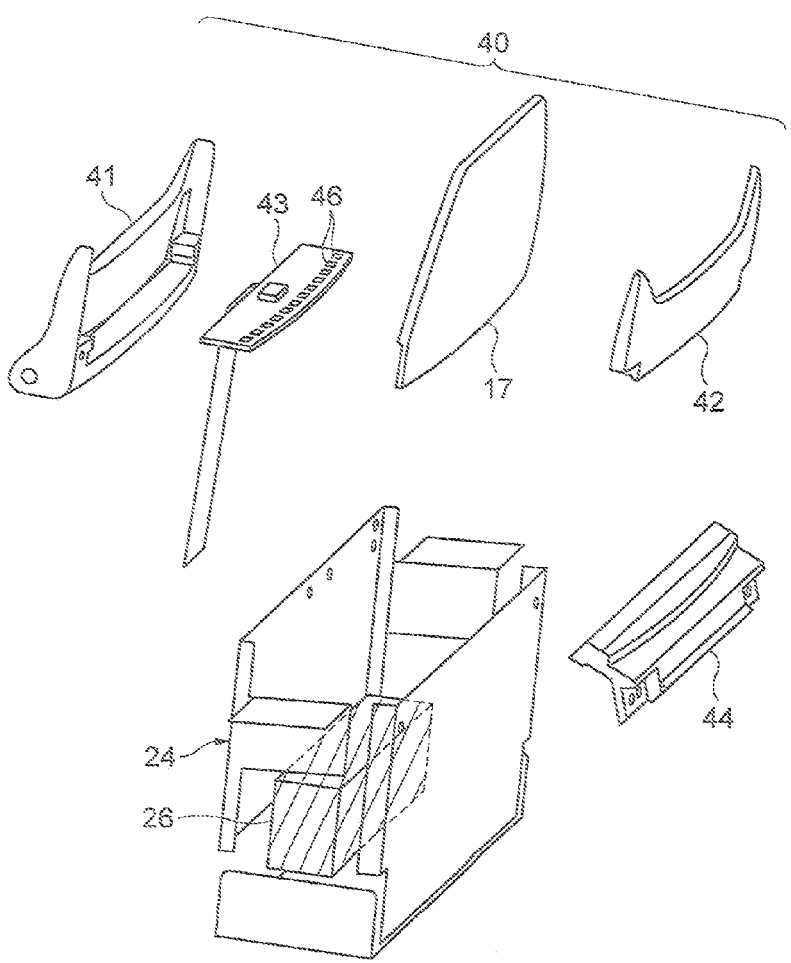

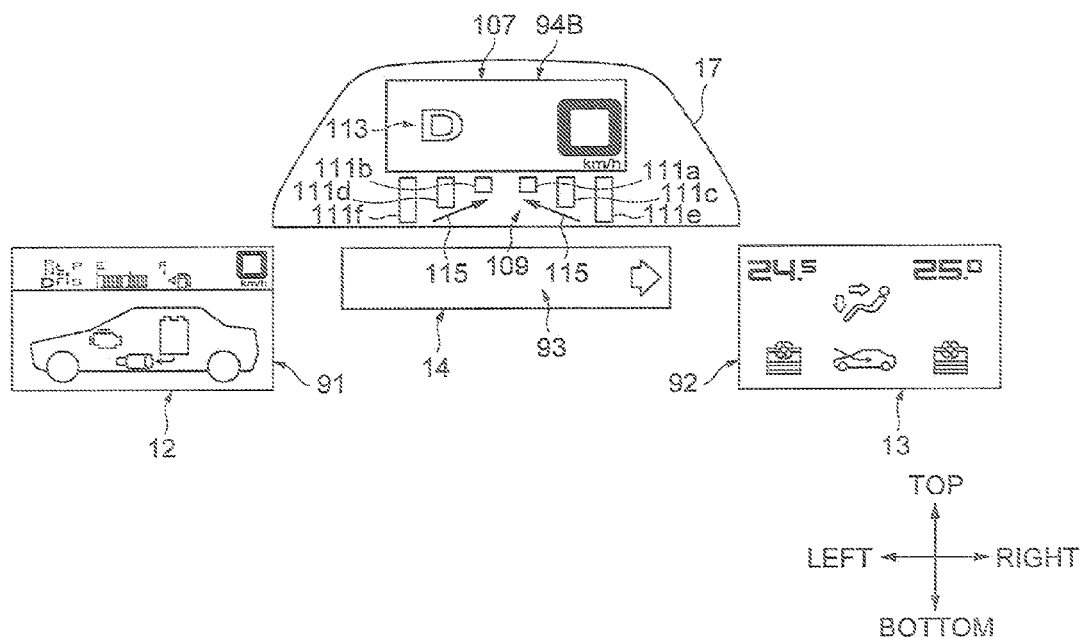
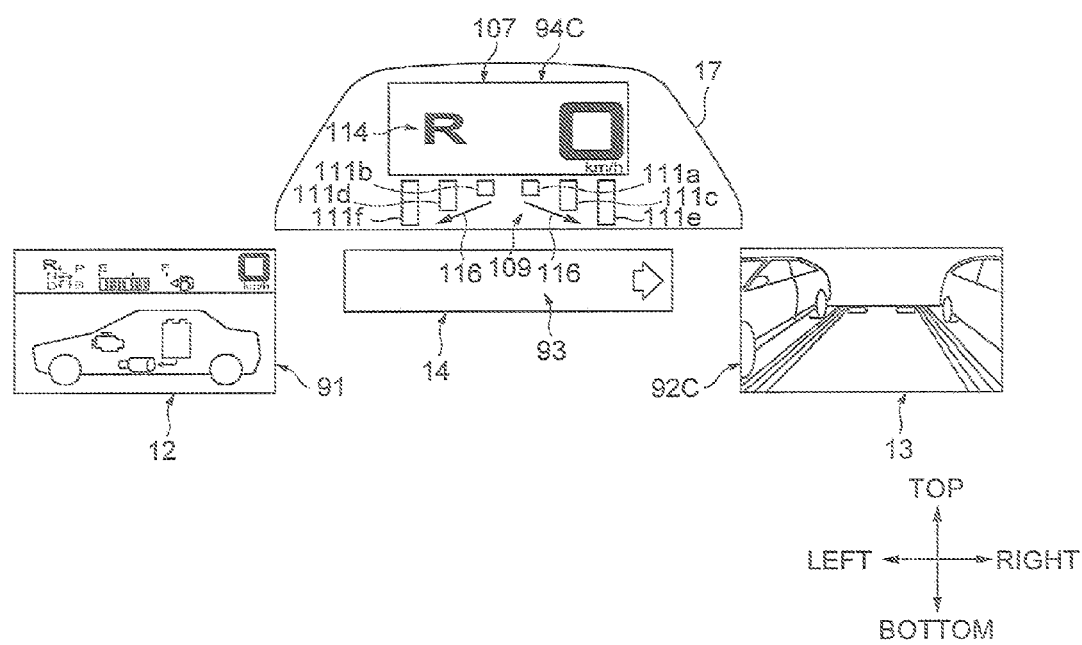

HEAD-UP DISPLAY DEVICE

CROSS-REFERENCE TO RELATED APPLICATIONS

The present application claims priority to and incorporates by reference the entire contents of Japanese Patent Application No. 2013-144888 filed in Japan on Jul. 10, 2013.

BACKGROUND OF THE INVENTION

1. Field of the Invention

The present invention relates to a head-up display device mounted on a vehicle and particularly relates to a technique to notify a driver of a shift position of a transmission of the vehicle.

2. Description of the Related Art

An example of general head-up display devices mounted on vehicles is structured such that display light emitted from a projection unit is projected on an optical member (half mirror), which is called a combiner, and the light reflected by the surface of the combiner guided to a predetermined eye point, which is a driver's viewing position (e.g., refer to Japanese Patent Application Laid-open No. 2006-11122). The combiner is disposed at a position easily visible to the driver, such as above an instrument panel in front of a driver's seat. As the reflective surface of the display light, a front windshield is used instead of the combiner in some cases.

The head-up display device has an advantage in that a driver needs little focus adjustment to visually recognize a display image because the image is formed as a virtual image at a position in front of the position of the combiner in a traveling direction of the vehicle. The head-up display device allows the driver to visually recognize a scenery ahead of the vehicle visually recognized through the combiner and the display image formed ahead in the traveling direction of the vehicle in a superimposed manner, thereby making it possible to provide information in a new aspect different from a display using a typical display panel.

Such a head-up display device can be used for displaying a traveling speed of a vehicle, for example. The head-up display device is suitable for displaying high priority information such as a vehicle speed because the driver can visually recognize a speed indication while looking head-up, without significantly moving a sight line or adjusting the focus.

Gears (speed reduction ratios) of a transmission mounted on a vehicle are shifted in accordance with shift positions. For example, an automatic transmission has the following shift positions: a park position "P", a reverse position "R", a neutral position "N", and a drive position "D". A driver, thus, needs to grasp a current shift position when driving the vehicle. For example, if the driver starts driving the vehicle by changing the shift position to the reverse position "R" whereas the driver intends to drive the vehicle forward by changing the shift position to the drive position "D", the vehicle may be moved in a different direction from that of the driver's intention.

The present invention has been made in view of the above-described circumstance, and it is an object of the present invention to provide a head-up display device that allows a driver to readily grasp the current shift position.

SUMMARY OF THE INVENTION

It is an object of the present invention to at least partially solve the problems in the conventional technology.

According to one aspect of the present invention, a head-up display device mounted on a vehicle for use, includes a projector configured to project display light including a display image onto a reflecting plate; a pair of first light sources and a pair of second light sources configured to project emitted light onto the reflecting plate; and a controller connected to the first light sources and the second light sources, wherein the display light from the projector is reflected by the reflecting plate in a viewing direction to define a display area on the reflecting plate, the emitted light from the first light sources is reflected by the reflecting plate in the viewing direction to display a pair of first guide lights side by side adjacent to the display area on the reflecting plate, the emitted light from the second light sources is reflected by the reflecting plate in the viewing direction to display a pair of second guide lights at outer sides of the respective first guide lights on the reflecting plate, and the controller controls lighting states of the first light sources and the second light sources to change at least one of number of light sources to be lit, lighting cycle, and lighting order of the first light sources and the second light sources in accordance with a change in shift position of a transmission of the vehicle.

According to another aspect of the present invention, the controller turns on the second light sources and thereafter turns on the first light sources when the shift position is changed to a forward moving state, while the controller turns on the first light sources and thereafter turns on the second light sources when the shift position is changed to a backward moving state.

According to still another aspect of the present invention, an optical path length from the reflecting plate to the first light sources is larger than an optical path length from the reflecting plate to the second light sources.

The present invention has been briefly described. The detail of the present invention will be more apparent from the following description of the best mode for carrying out the invention with reference to the accompanying drawings.

BRIEF DESCRIPTION OF THE DRAWINGS

FIG. 7 is an exploded perspective view illustrating an outline of an overall structure of the display unit;

FIG. 8 is an exploded perspective view illustrating a structure of a meter subassembly;

FIGS. 9A and 9B illustrate the combiner and a combiner illumination substrate, FIG. 9A is a front view of the combiner and a combiner illumination substrate and FIG. 9B is a side view of the combiner and the combiner illumination substrate;

FIG. 10 is an exploded perspective view illustrating a structure of a driving unit subassembly;

FIG. 19 is a front view to explain the display contents of the display unit when the shift position is changed to the forward moving state; and FIG. 20 is a front view to explain the display contents of the display unit when the shift position is changed to the backward moving state.

DETAILED DESCRIPTION OF THE PREFERRED EMBODIMENT

The following describes a concrete embodiment of a head-up display device of the present invention with reference to the accompanying drawings.

[Configuration of Mechanical Section]
[Explanation of Overall Outline]

Figure 1:
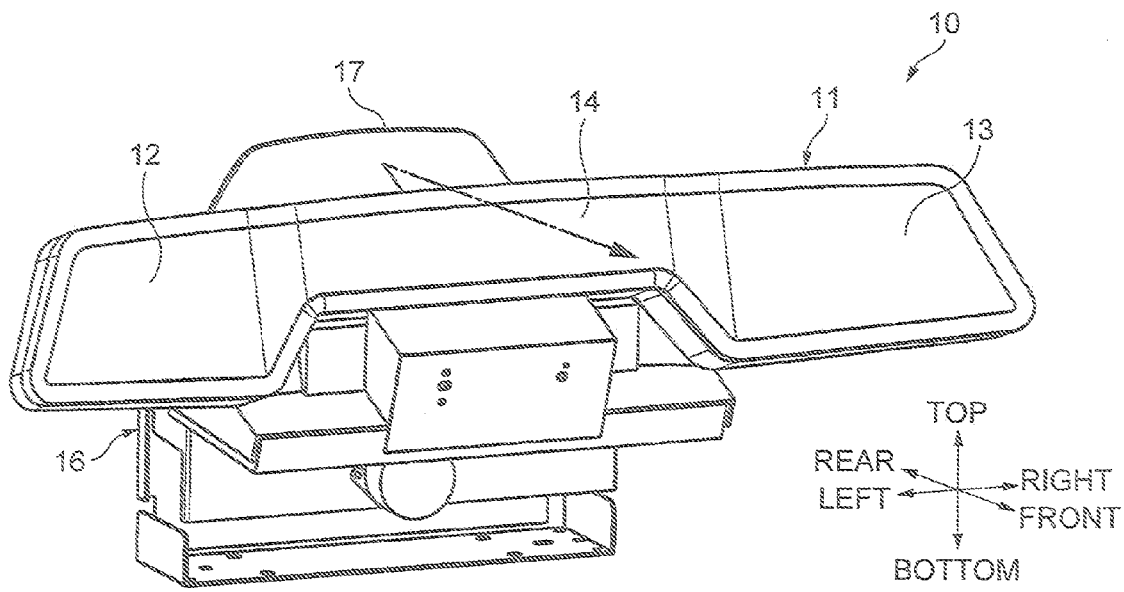
FIG. 1 is a perspective view illustrating an overall appearance of a display unit when viewed from a front side.
Figure 2:
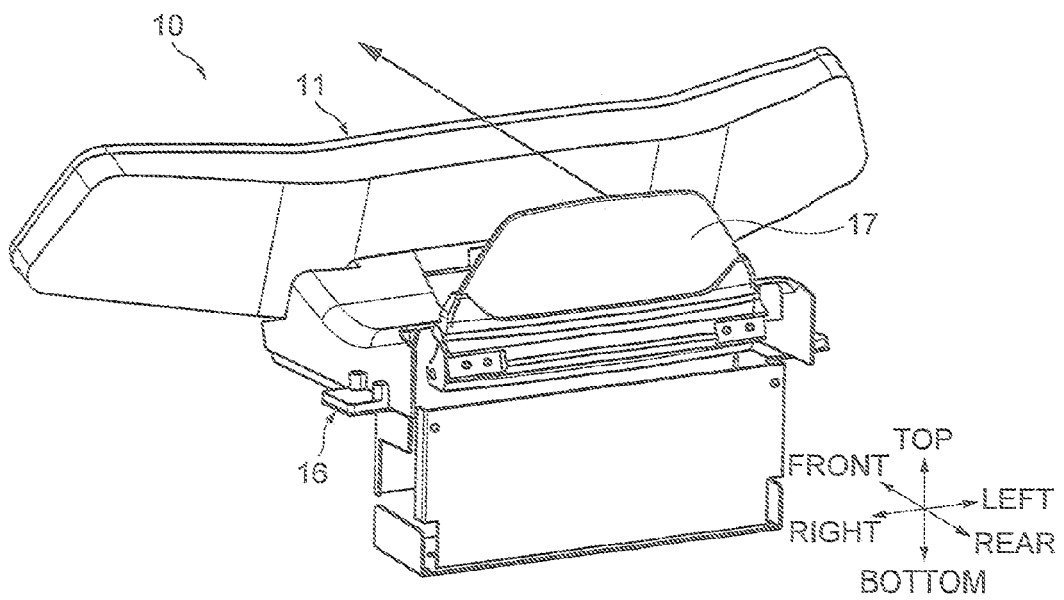
FIG. 2 is a perspective view illustrating the overall appearance of the display unit when viewed from a rear side.
Figure 3:
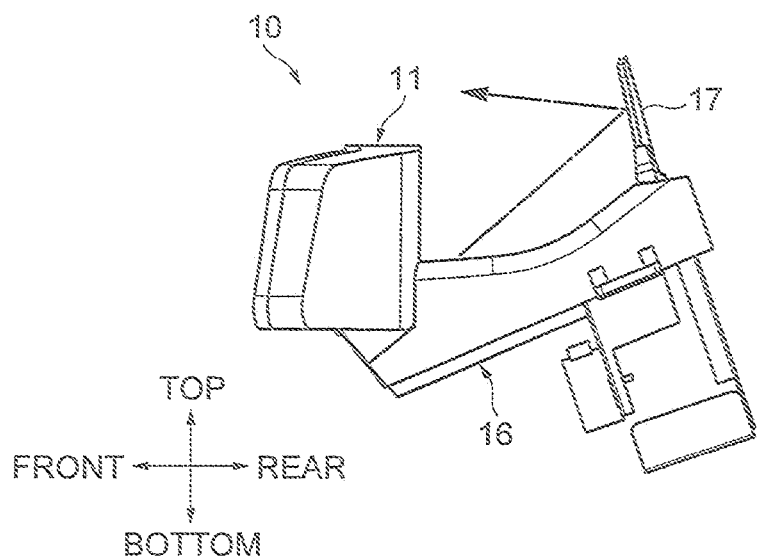
FIG. 3 is a perspective view illustrating the overall appearance of the display unit when viewed from a lateral side.
Figure 4:
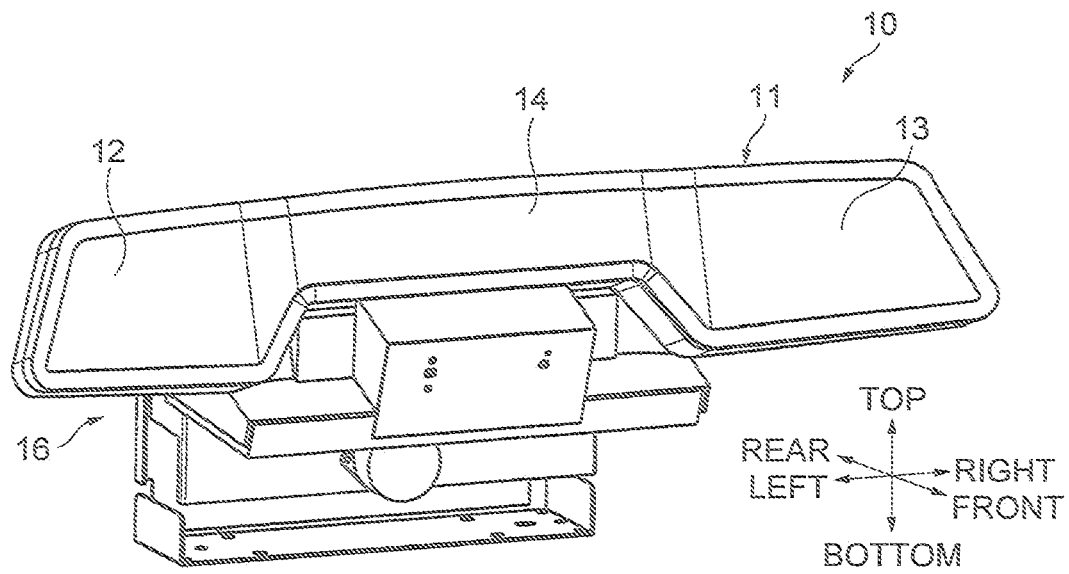
FIG. 4 is a perspective view illustrating the display unit that houses a combiner when viewed from the front side.
Figure 5:
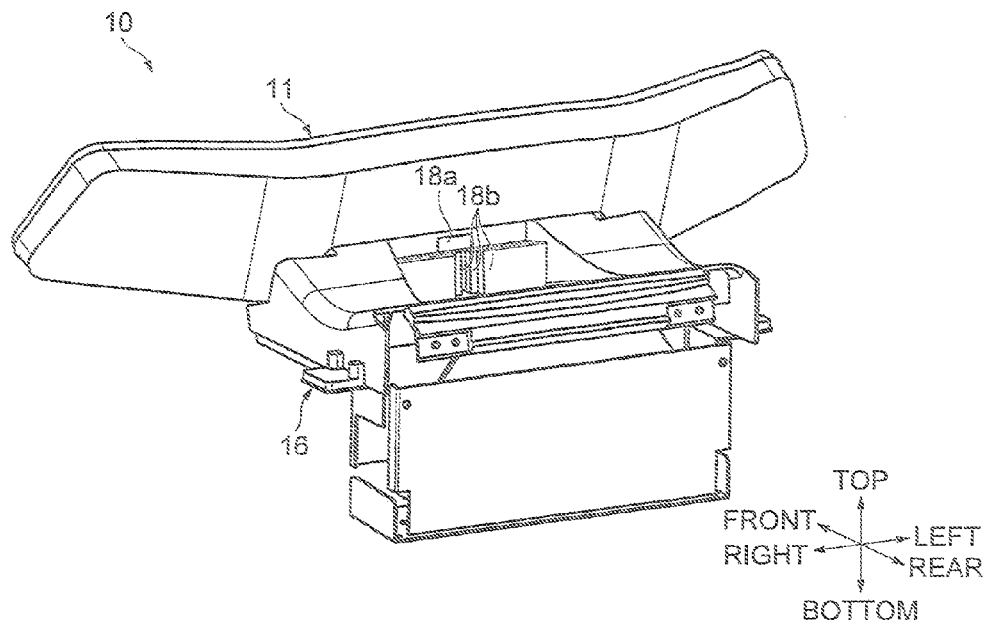
FIG. 5 is a perspective view illustrating the display unit that houses the combiner when viewed from the rear side.
Figure 6:
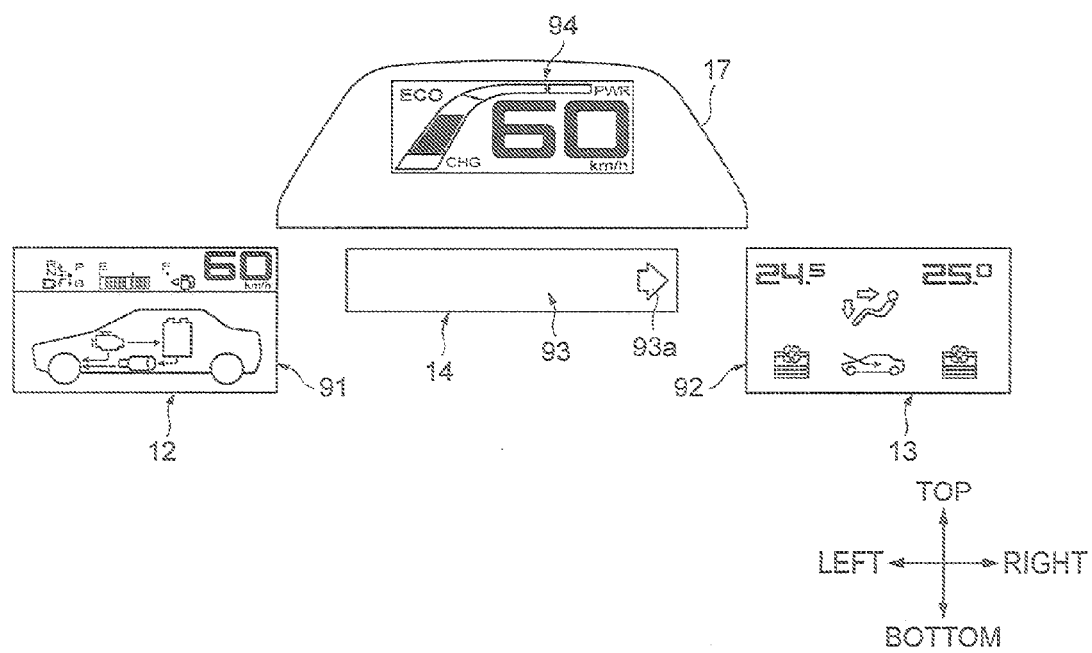
FIG. 6 is a front view illustrating an example of a display of the whole of the display unit in a normal driving state.

FIGS. 1 to 3 are perspective views illustrating the general exterior appearance of a display unit 10, FIG. 1 is a perspective view of an overall appearance of a display unit 10 when viewed from a front side, FIG. 2 is a perspective view of the overall appearance of the display unit 10 when viewed from a rear side, and FIG. 3 is a perspective view of the overall appearance of the display unit 10 when viewed from a lateral side. FIGS. 1 to 3 each illustrate a use state in which a combiner 17 protrudes from a housing. FIG. 4 is a perspective view illustrating the display unit 10 in a stored state in which the combiner 17 is housed in the housing when viewed from the front side. FIG. 5 is a perspective view illustrating the display unit 10 in the stored state when viewed from the rear side. FIG. 6 is a front view illustrating an example of a display of the whole of the display unit 10 in a normal driving state.

The directions indicated as "left" and "right" in FIGS. 1 to 6 correspond to the left and the right directions respectively when the display unit 10 disposed in front of a driver's seat in a vehicle is viewed from the driver's seat side. The directions indicated as "front" and "rear" in FIGS. 1 to 6 correspond to the front and the rear directions of the display unit 10. In other words, in the "front" direction, the display unit 10 faces a driver sitting in the driver seat while the "rear" is expressed as the rear side of the display unit 10 when viewed from the driver's seat side. The directions indicated as "top" and "bottom" in FIGS. 1 to 6 correspond to the up and the down directions of the vehicle. In the following drawings besides FIGS. 1 to 6, the respective directions are also indicated using the "left", "right", "front", "rear", "top", and "bottom" in the same manner as described above. The front and the rear in a viewing direction when viewed from the driver as described above are reversed from those in the traveling direction of the vehicle.

The display unit 10 illustrated in FIGS. 1 to 6 includes a meter unit 11 and a head-up display (HUD) device 16, which are integrally combined with each other. The display unit 10 is built inside an instrument panel (not illustrated) of the vehicle and is disposed in such a manner that a part of the display unit 10 is exposed outside the instrument panel so as to be visually recognized by the driver. Particularly, the display unit 10 is disposed such that the combiner 17 of the HUD device 16 protrudes from the instrument panel in the use state while the display unit 10 is disposed such that the combiner 17 is stored below the instrument panel in the stored state. In other words, the combiner 17 is visually recognizable by the driver in the use state while the combiner 17 is not visually recognized by the driver in the stored state.

As illustrated in FIGS. 1 to 3, the meter unit 11 includes two displays of a left side display 12 and a right side display 13. As illustrated in FIG. 1, the left side display 12 is disposed on the left side of the meter unit 11 while the right side display 13 is disposed on the right side of the meter unit 11. The meter unit 11 further includes a center display 14, which can display indication lights for displaying such as warnings, between the left side display 12 and the right side display 13. The respective displays are described later in detail. The meter unit 11 including the displays is used for displaying various types of information useful for driving the vehicle in the same manner as the meter units of general vehicles. For example, the meter unit 11 displays a speedometer that displays a traveling speed of the vehicle and an odometer that displays a traveling distance of the vehicle. The meter unit 11 displays also an indicator that displays a shift position of a transmission lever (gearshift lever), a fuel indicator that displays the level of fuel still available, and warning indicators that warn the driver of the occurrence of various abnormalities, for example. The left side display 12 and the right side display 13 of the meter unit 11 use liquid crystal display panels that can provide graphic displays, thereby making it possible to display an image (video image) taken by a vehicle-mounted camera, for example.

The HUD device 16 projects display images on the combiner 17 having a planer shape, which is a translucent reflecting plate (half mirror) to display various kind of information. As illustrated in FIGS. 1 to 3, the combiner 17 protrudes above the center display 14 in the use state. As a result, the driver can visually recognize a display image, which is displayed on the combiner 17, without significantly moving the driver's sight line from that in the normal driving state. The HUD device 16 forms the display image as a virtual image at a position further ahead in the "rear" direction from the position of the combiner 17, thereby requiring only slight focus adjustment of the driver to make the display visually recognizable. The HUD device 16 can provide a display function having high visibility with little movement of the sight line and focus adjustment of the driver. The HUD device 16 allows the driver to visually recognize a scenery ahead of the vehicle, which is visually recognized through the combiner 17, and the display image displayed on the combiner 17 in a superimposed manner, thereby making it possible to provide information in a new aspect different from a display using a typical display panel.

FIG. 6 is a front view illustrating an example of a display of the whole of the display unit in a normal driving state. As illustrated in FIG. 6, the combiner 17 located above the center display 14 displays high priority information, such as a current vehicle speed (with a character or a number such as 60 km/h) as an HUD display content 94 and an indicator indicating an ecology degree of driving, in a large and easily viewable state. The left side display 12 displays, as a left screen display content 91, a display element indicating a state of a hybrid system, the speedometer, the fuel indicator, and the shift position of the transmission, for example. The right side display 13 displays, as a right screen display content 92, display elements indicating a state of air conditioning. The center display 14 displays a center display content 93, in which a right turn indicator 93a blinks, for example, so as to inform the driver of a turn signal blinking.

As another use form of the display unit 10, the combiner 17 displays information about the periphery of the vehicle by being superimposed on a scenery ahead of the vehicle while the left side display 12 displays the speedometer and the odometer and the right side display 13 displays an image, which is taken by the vehicle-mounted camera, of the left and right rear side of the vehicle in the meter unit 11. As still another use form, the combiner 17 displays the vehicle speed while the left side display 12 displays an image of the left rear side of the vehicle taken by the vehicle-mounted camera and the right side display 13 displays an image of the right rear side of the vehicle taken by the vehicle-mounted camera in the meter unit 11.

[Explanation of Detailed Configurations of Respective Units]

FIG. 7 is an exploded diagram illustrating primary components of the display unit 10.

As illustrated in FIG. 7, the display unit 10 includes a meter subassembly 21, a display-light projector 22, a projector case 23, a driving unit assembly 24, a main substrate assembly 25, a cover 27, an ambient light source 28, and an ambient prism unit 29.

[Explanation of Display-Light Projector 22]

The display-light projector 22 has a function to project display light including a display image displayed by the HUD device 16 toward the combiner 17.

As illustrated in FIG. 7, the display-light projector 22 includes a heat sink 22a, a heat conductive sheet 22b, a backlight substrate 22c, a lens array 22d, a backlight case 22e, a diffusion sheet 22f, a liquid crystal display 22g, and a shield case 22h in this order from the front side thereof.

The liquid crystal display 22g has a large number of two-dimensionally arranged display pixels and can individually control on and off of and a display color of each pixel. As a result, the liquid crystal display 22g can display any visible information such as graphics, characters, and images on a screen thereof.

The liquid crystal display 22g, which is a transparent liquid crystal panel, can project display light including a display image displayed on the screen thereof by being lighted by a backlight disposed on the backlight substrate 22c from behind. The display light are projected toward the combiner 17 from a display light emitting port 18a, which is an opening provided on the projector case 23 as illustrated in FIGS. 5 and 7, and also in FIG. 12 referred to in the following description.

The combiner 17 is mounted in the driving unit assembly 24 and supported in a movable manner in the up and the down directions. When the HUD device 16 is in the display state, the combiner 17 moves from the driving unit assembly 24 to the position where the combiner 17 protrudes above the instrument panel and reflects the display light emitted from the display-light projector 22. The light reflected by the reflective surface of the combiner 17 travel toward a predetermined eye point that corresponds to the positions of the driver's eyes. In other words, the light reflected by the reflective surface of the combiner 17 travel along the viewing direction of the driver. As a result, the driver can visually recognize visible information displayed on the screen of the liquid crystal display 22g as a virtual image reflected on the combiner 17.

[Explanation of Outline of Ambient Light Display]

In the embodiment, light can also be projected on the surface of the combiner 17 so as to display a virtual image besides the light including the display image of the liquid crystal display 22g. The ambient light source 28 provided on the main substrate assembly 25 is provided to be used for such a display. The ambient prism unit 29 is disposed at a position opposite the ambient light source 28. The ambient light source 28 is composed of a plurality of light emitting diodes (LEDs). The ambient prism unit 29 is composed of a plurality of prisms arranged in such positions that they individually face the respective LEDs.

Light obtained by the light emission of the ambient light source 28 are incident on the ambient prism unit 29 from below and reflected by surfaces near the tops of the prisms and projected toward the combiner 17 from an ambient light emitting port 18b provided on the projector case 23 (refer to FIGS. 5 and 7). The ambient light are also reflected by the reflective surface of the combiner 17 and travel along the viewing direction of the driver. While the ambient light source 28 emits light, the driver can also visually recognize the light from the ambient light source 28 as a virtual image reflected on the combiner 17.

In the present embodiment, a plurality of ambient light displays can be displayed in a three-dimensional manner utilizing differences in optical path lengths. The structure of such display is described later in detail.

[Explanation of Meter Assembly 21]

A meter subassembly 21 is the main body of the meter unit 11. FIG. 8 is an exploded schematic diagram illustrating primary components of the meter subassembly 21.

As illustrated in FIG. 8, the meter subassembly 21 includes, in the order from the rear side, a rear cover 31, a substrate 32, a case 33, a plurality of diffusion sheets 34, telltale lenses 35a and 35b, a meter left display 36L, a meter right display 36R, a facing plate 37, and a front glass 38.

The substrate 32 has a rectangular shape and extends in the left-right direction. Light emitters 32a and 32b are provided near the respective left and right ends of the substrate 32. A light emitter 32c is disposed between the light emitters 32a and 32b. The respective light emitters 32a, 32b, and 32c individually include a plurality of LEDs.

Respective light emitted from the light emitters 32a, 32b, and 32c toward the "front" direction sequentially pass through the openings of the case 33, the diffusion sheets 34, the telltale lenses 35a and 35b, and the openings of the facing plate 37, and is reflected on the surface of the front glass 38 as indication lights such as various warnings. The indication lights are displayed on the center display 14 and visually recognized by the driver. The front glass 38 is a smoked glass, which is a translucent.

The meter left display 36L and the meter right display 36R are independent color liquid crystal display panels each having a large number of two-dimensionally arranged display pixels. The on and off and colors of the display pixels of the meter left display 36L and the meter right display 36R can be individually controlled. As a result, the meter left display 36L and the meter right display 36R can display any visible information such as graphics, characters, and images on the screens.

The display contents of the respective screens of the meter left display 36L and the meter right display 36R pass through the openings of the facing plate 37 and is displayed on the surface of the front glass 38. The display content of the meter left display 36L is displayed on the left side display 12 and visually recognized by the driver while the display content of the meter right display 36R is displayed on the right side display 13 and visually recognized by the driver.

[Configuration Near Combiner]

FIG. 9A is a front view of the combiner 17 and a combiner illumination substrate 43 when viewed from the front side. FIG. 9B is a side view of the combiner 17 and the combiner illumination substrate 43 when viewed from the lateral side. FIG. 10 is an exploded perspective view of primary components of a driving unit subassembly 40 housed in the driving unit assembly 24.

As illustrated in FIG. 10, the driving unit subassembly 40 includes the combiner 17, a front combiner holder 41, a rear combiner holder 42, and the combiner illumination substrate 43. The combiner 17 is interposed between the front combiner holder 41 and the rear combiner holder 42 and integrally held by the holders 41 and 42.

The combiner illumination substrate 43 having a thin plate shape is disposed at a position where the combiner illumination substrate 43 supports the bottom of the combiner 17. An end face light source 46 is disposed on the top surface of the combiner illumination substrate 43. The end face light source 46 is composed of a large number of LEDs arranged in line in the left-right direction.

As illustrated in FIGS. 9A, 9B, and 10, the end face light source 46 of the combiner illumination substrate 43 is disposed at such a position that the end face light source 46 faces the bottom edge of the combiner 17. The bottom edge of the combiner 17 has a illumination light incident section 17a that guides illumination light of the end face light source 46 inside the combiner 17. The combiner 17 has an illumination light reflecting part 17c formed on the top edge and the left and right edges, which edges are formed in the directions perpendicular to the thickness direction of the combiner 17. As illustrated in FIGS. 9A and 9B in the embodiment, the illumination light reflecting part 17c on the top edge is formed as a bevel that faces the front side and inclines such that the distance between the bevel and the combiner illumination substrate 43 increases toward the rear side. The illumination light reflecting part 17c on the left and right edges are formed as a bevel that inclines such that the bevel faces the front side and extends outward in the circumferential direction of the combiner 17. The bevel formed on the edges of the combiner 17 reflects illumination light from the end face light source 46 toward the front side. The illumination light reflecting part 17c may be partially formed on the top, the left, and the right edges of the combiner 17 while the illumination light reflecting part 17c is formed entirely on the top, the left, and the right edges of the combiner 17 in the embodiment. For example, the illumination light reflecting part 17c may be formed on only any one of the top, the left, and the right edges.

The following describes the paths of the display light ray projected from the display-light projector 22 and the illumination light emitted from the end face light source 46.

The display light ray projected from the display-light projector 22 passes through the display light emitting port 18a, is incident on a display light reflective surface 17b, which is the surface on one side (on the front side) in the thickness direction of the combiner 17, and is reflected by the surface of the display light reflective surface 17b, and then travels toward a predetermined eye point that corresponds to the positions of the driver's eyes. As a result, the driver visually recognizes a display image included in the display light.

When the end face light source 46 emits light, the illumination light obtained by the light emission of the end face light source 46 are guided inside the combiner 17 from the illumination light incident section 17a, pass through inside the combiner 17, are reflected by the surface of the illumination light reflecting part 17c, and travel toward the eye point as illustrated in FIG. 9B. As a result, the driver visually recognizes the state where the top, the left, and the right edges of the combiner 17 are lighted in a belt-like shape as illustrated in FIG. 9A. The HUD device 16 of the display unit 10 can achieve a newer visual effect than that of the conventional HUD device that displays display images only on the surface of the combiner 17 because the HUD device 16 can light the side edges of the combiner 17.

The driving unit subassembly 40 illustrated in FIG. 10 is housed in the driving unit assembly 24 and connected to a driving mechanism 26. The driving mechanism 26 can move the driving unit subassembly 40 including the combiner 17 in the up and the down directions by the driving power, and can position the combiner 17 at a position where the whole of the combiner 17 is housed in the driving unit assembly 24, i.e., in the stored state, and at another position where the combiner 17 protrudes above the instrument panel. When the combiner 17 is at the position where the combiner 17 is in the stored state, an instrument panel cover 44 illustrated in FIG. 10 covers the opening of the instrument panel.

[Detailed Explanation of Ambient Light Display]

Figure 11:
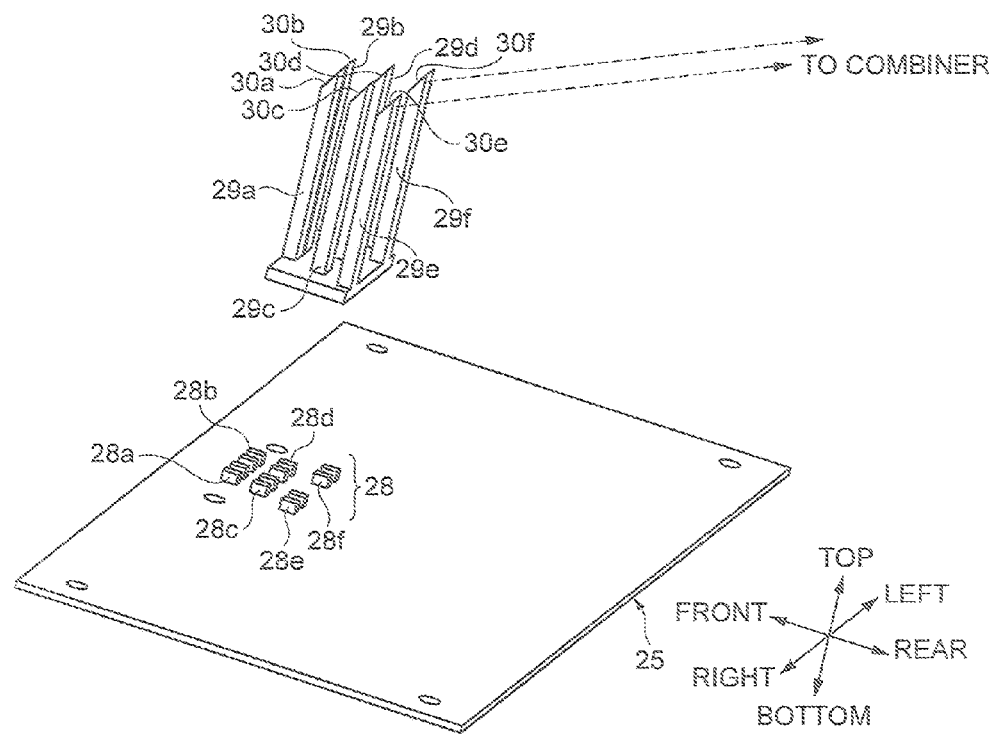
FIG. 11 is an enlarged view illustrating a main substrate assembly.
Figure 12:
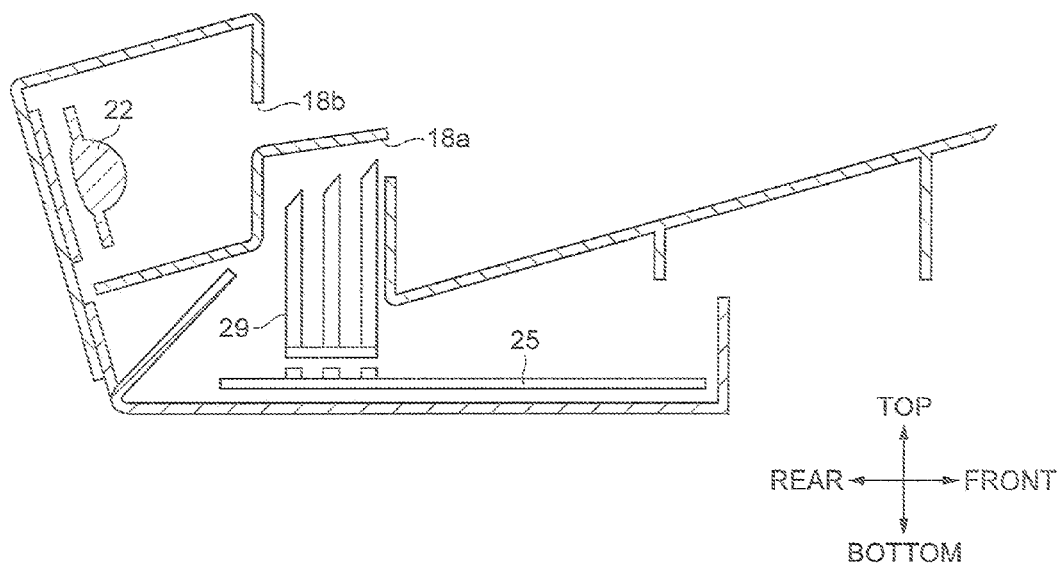
FIG. 12 is an explanatory view to explain a disposition of the main substrate assembly and a side view of the main substrate assembly.
Figure 13:
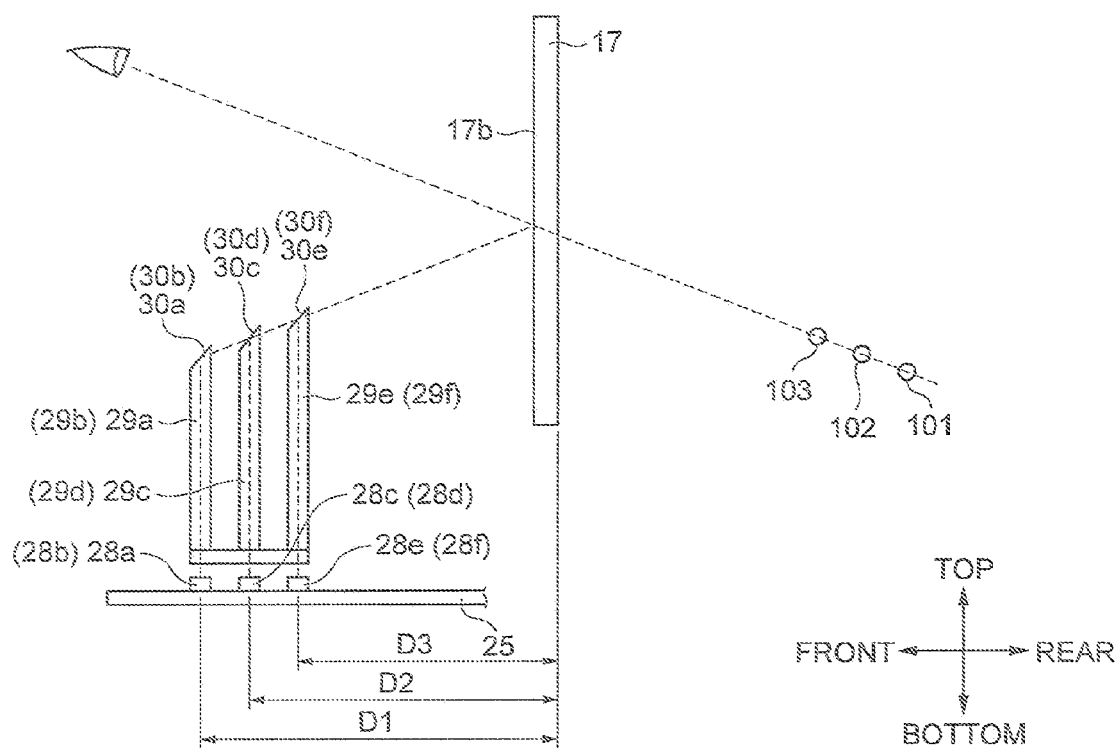
FIG. 13 is an explanatory view to explain optical paths of guide lights using an ambient light source and a side view illustrating the main substrate assembly and the combiner.
Figure 14:
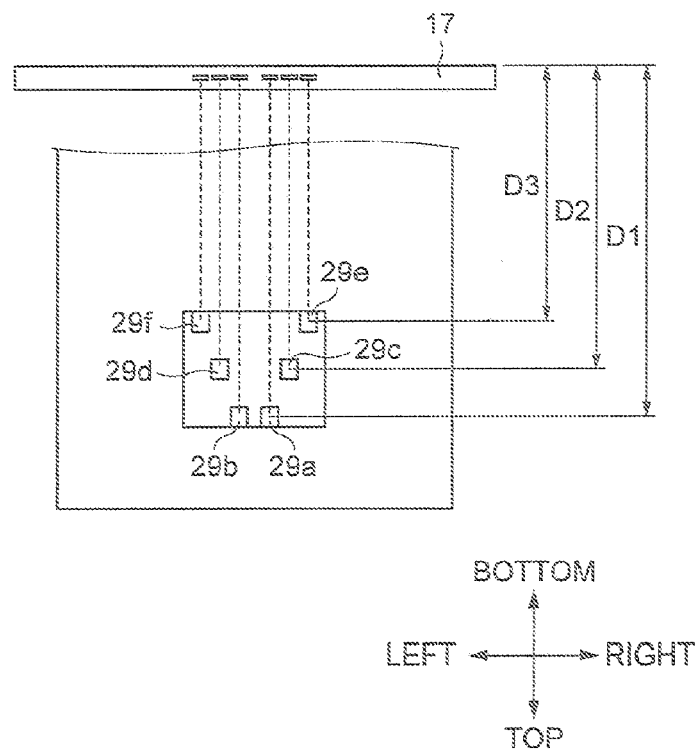
FIG. 14 is an explanatory view to explain the optical paths of the guide lights using the ambient light source and a plan view illustrating the main substrate assembly and the combiner.

FIG. 11 is an enlarged view of the main substrate assembly. FIGS. 12 to 14 are explanatory views. FIG. 12 is a side view of the main substrate assembly. FIGS. 13 and 14 are a side view and a planer view, respectively, illustrating the main substrate assembly and the combiner.

As illustrated in FIG. 11, the ambient prism unit 29 is composed of six prisms of prisms 29a, 29b, 29c, 29d, 29e, and 29f arranged at different positions from each other in a plane of the main substrate assembly 25. The six prisms extend in the up-down direction and are formed such that they are integrated by being combined at respective one ends in the longitudinal direction. The respective other ends (near the tops) of the prisms are sharpened with acute angles to form reflective surfaces 30a, 30b, 30c, 30d, 30e, and 30f that reflect light emitted from the ambient light source 28, which is described later, toward the combiner 17.

In the embodiment, the prisms 29a and 29b, which are arranged at positions adjacent to each other in the left-right direction, are paired. Likewise, the prisms 29c and 29d are paired and the prisms 29e and 29f are paired. As illustrated in FIG. 14, the distance between the prisms 29a and 29b in the left-right direction is the smallest. The prism 29c is disposed outside the prism 29a while the prism 29d is disposed outside the prism 29b. The prism 29e is disposed outside the prism 29c while the prism 29f is disposed outside the prism 29d. As illustrated in FIG. 14, the respective pairs are arranged in the left-right direction such that the respective centers of the pairs in the left-right direction are on the same line in the front-rear direction.

As illustrated in FIG. 13, the three pairs of prisms 29a and 29b, 29c and 29d, and 29e and 29f are arranged at different positions from each other in the front-rear direction. In the embodiment, in the order from the side farthest from the combiner 17 (from the front side), the pair of prisms 29a and 29b, 29c and 29d, and 29e and 29f are arranged side by side.

The ambient light source 28 is composed of six light sources of light sources 28a to 28f. As illustrated in FIG. 11, each of the six light sources 28a to 28f is composed of a pair of LEDs, one of which emits red light and the other of which emits green light. As illustrated in FIGS. 11 to 14, the six light sources 28a to 28f are arranged at positions that face the respective bottoms of the prisms 29a to 29f.

As illustrated in FIG. 13, a light ray emitted from the light source 28a is incident on the prism 29a, passes in the prism 29a, and is reflected by the reflective surface 30a formed near the top of the prism 29a. Thereafter, the light ray passes through the ambient light emitting port 18b illustrated in FIG. 12 and travels toward the combiner 17 (also refer to FIGS. 5 and 7). As illustrated in FIG. 13, the reflected light ray is reflected by the display light reflective surface 17b of the combiner 17 in the viewing direction and travels toward the eye point that corresponds to the positions of the driver's eyes. In this case, the image reflected on the driver's eyes is visually recognized through the combiner 17 as a virtual image 101 at a position ahead the combiner 17.

Likewise, a light ray emitted from the light source 28c is incident on the prism 29c, passes in the prism 29c, and is reflected by the reflective surface near the top of the prism 29c, and then travels toward the combiner 17. The reflected light ray is reflected by the combiner 17 in the viewing direction and travels toward the eye point, and then visually recognized by the driver as a virtual image 102. A light ray emitted from the light source 28e is incident on the prism 29e, passes in the prism 29e, and is reflected by the reflective surface near the top of the prism 29e, and then travels toward the combiner 17. The reflected light ray is reflected by the combiner 17 in the viewing direction and travels toward the eye point, and is then visually recognized by the driver as a virtual image 103. The respective light emitted from the light sources 28b, 28d, and 28f also travel in the same manner as described above.

The three pairs of prisms 29a and 29b, 29c and 29d, and 29e and 29f are arranged at different positions from each other in the front-rear direction. As a result, the optical paths of light emitted from the respective pairs of prisms differ in length from each other. As illustrated in FIGS. 13 and 14, the distances between the respective prisms 29a to 29f and the combiner 17 in the viewing direction of the driver (in the front-rear direction) differ from each other as distances D1, D2, and D3. The respective light emitted from the pairs of light sources 28a and 28b, 28c and 28d, and 28e and 28f differ in optical path length to reach the eye point depending on the distances D1, D2, and D3.

Due to such differences in optical path lengths, light emitted from the light sources 28a and 28b form images at the position of the virtual image 101, light emitted from the light sources 28c and 28d form images at the position of the virtual image 102, and light emitted from the light sources 28e and 28f form images at the position of the virtual image 103. The virtual images 101 to 103 illustrated in FIG. 13 are formed at different positions from each other in the rear direction viewed from the driver. As a result, the driver visually recognizes that they are lighted at different positions in the front-rear direction.

As illustrated in FIG. 12, the display-light projector 22 is disposed behind the ambient light source 28. The optical path length from the display-light projector 22 to the combiner 17 is thus larger than the distances D1, D2, and D3. As a result, the virtual images 101 to 103 are formed behind the display images displayed on the combiner 17. The positions where guide lights 111a to 111f are formed are thus behind the display images.

[Configuration of Electrical Circuit]

Figure 15:
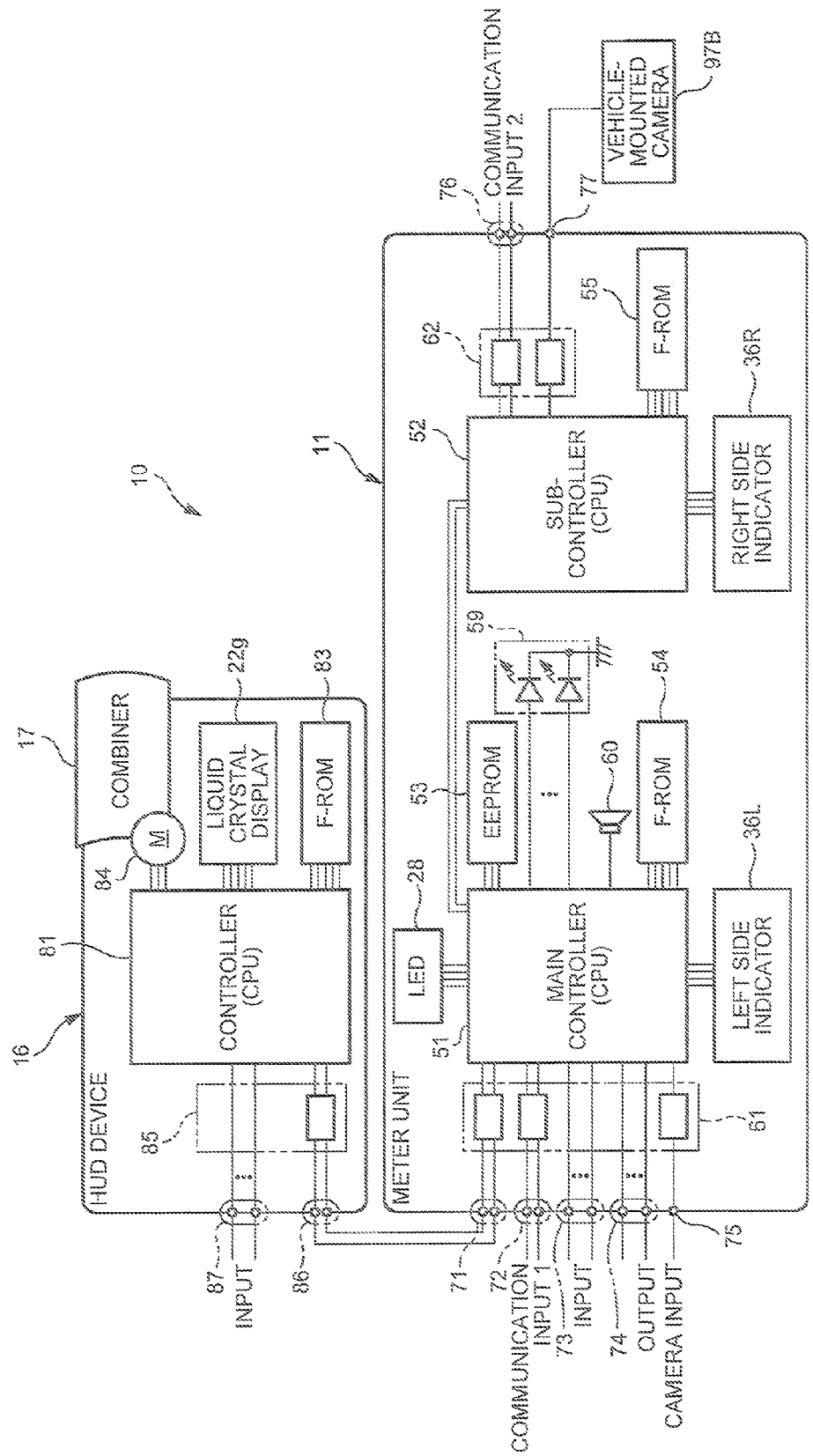
FIG. 15 is a block diagram illustrating a structure of an electrical circuit of the display unit.

FIG. 15 illustrates a structure of an electrical circuit of the display unit 10.

[Explanation of Meter Unit 11]

As illustrated in FIG. 15, the electrical circuit of the meter unit 11 includes a main controller 51, a sub-controller 52, memories 53 to 55, the meter left display 36L, the meter right display 36R, the ambient light source 28, a light emitter 59, a speaker 60, and interfaces 61 and 62.

The main controller 51 and the sub-controller 52 individually include a microcomputer (a central processing unit (CPU)). The memory 53 is an electrically erasable programmable read only memory (EEPROM). The memories 54 and 55 are flash memories (F-ROMs). The memories 53 and 54 preliminarily retain programs, various constants, and display data necessary for the operation of the main controller 51, for example. The memory 55 preliminarily retains programs, various constants, and display data necessary for the operation of the sub-controller 52, for example.

The light emitter 59 includes the light emitters 32a, 32b, and 32c illustrated in FIG. 8 and the end face light source 46 illustrated in FIGS. 9A, 9B and 10.

The main controller 51 and the sub-controller 52 are coupled through a communication line so as to enable communication therebetween. As a result, the main controller 51 can exchange necessary information with the sub-controller 52 and control the sub-controller 52.

The electrical circuit of the meter unit 11 includes a plurality of terminals that are connected to the main controller 51 through the interface 61. Specifically, a connection unit 71, a communication input unit 72, an input unit 73, an output unit 74, and a camera input unit 75 are connected to the interface 61. The electrical circuit of the meter unit 11 further includes a communication input unit 76 and a camera input unit 77, which are connected to the sub-controller 52 through the interface 62.

The connection unit 71 of the meter unit 11 is connected to the HUD device 16 through a communication line. As a result, the main controller 51 can exchange necessary information with the HUD device 16 and control the HUD device 16.

The respective communication input units 72 and 76 are connected to various electronic control units (ECUs), which control the vehicle, through a communication network. As a result, the main controller 51 and the sub-controller 52 of the meter unit 11 can receive various types of information about the vehicle from the ECUs of the vehicle. For example, the main controller 51 and the sub-controller 52 can receive information about the current shift position. To the input unit 73 of the meter unit 11, various input devices such as switches and sensors can be connected. To the output unit 74 of the meter unit 11, various output devices can be connected.

To the respective camera input units 75 and 77 of the meter unit 11, outputs of the vehicle-mounted cameras can be connected. Signals of images taken by the respective vehicle-mounted cameras can be input to the meter unit 11 from the camera input units 75 and 77.

In the embodiment, output from a vehicle-mounted camera 97B, which images the rear of the vehicle, is connected to the camera input unit 77.

The main controller 51 executes various types of processing in accordance with the preliminarily installed programs and updates information displayed on the screen of the meter left display 36L while collecting various types of data and performing communication. The main controller 51 can perform display control on a light emitter 58, display control on a light emitter 59, output control on the speaker 60, control on the sub-controller 52, and control on the HUD device 16, for example.

The sub-controller 52 executes various types of processing in accordance with the preliminarily installed programs and receives data from the communication input unit 76 and the camera input unit 77 to update information displayed on the screen of the meter right display 36R. In addition, the sub-controller 52 updates information displayed on the screen of the meter right display 36R in accordance with an instruction from the main controller 51.

[Explanation of HUD Device 16]

As illustrated in FIG. 15, the electrical circuit of the HUD device 16 includes a controller 81, the liquid crystal display 22g, a memory 83, an electrical motor 84, an interface 85, a connection unit 86, and an input unit 87.

The controller 81 includes a microcomputer (CPU). The memory 83, which is a flash memory (F-ROM), preliminarily retains programs, various constants, and display data necessary for the operation of the HUD device 16, for example.

The electrical motor 84 is a stepping motor and connected to the driving mechanism 26 built in the driving unit assembly 24 illustrated in FIG. 6. The driving unit subassembly 40 including the combiner 17 can be moved in the up and the down directions as a result of the driving of the electrical motor 84.

The connection unit 86 and the input unit 87 are connected to the controller 81 through the interface 85. The connection unit 86 is connected to the meter unit 11 through a communication line. To the input unit 87, various input devices such as switches and sensors can be connected. For example, an operation switch that instructs starting and ending of the HUD display is connected to the input unit 87.

The controller 81 executes various types of processing in accordance with the preliminarily installed programs and updates information displayed on the screen of the liquid crystal display 22g while collecting various types of data and performing communication through the connection unit 86 or the input unit 87. The controller 81 drives the electrical motor 84 in accordance with the instruction to start or end the HUD display and positions the combiner 17 at a predetermined display position or a predetermined stored position.

[Explanation of Main Control Operation]

Figure 16:
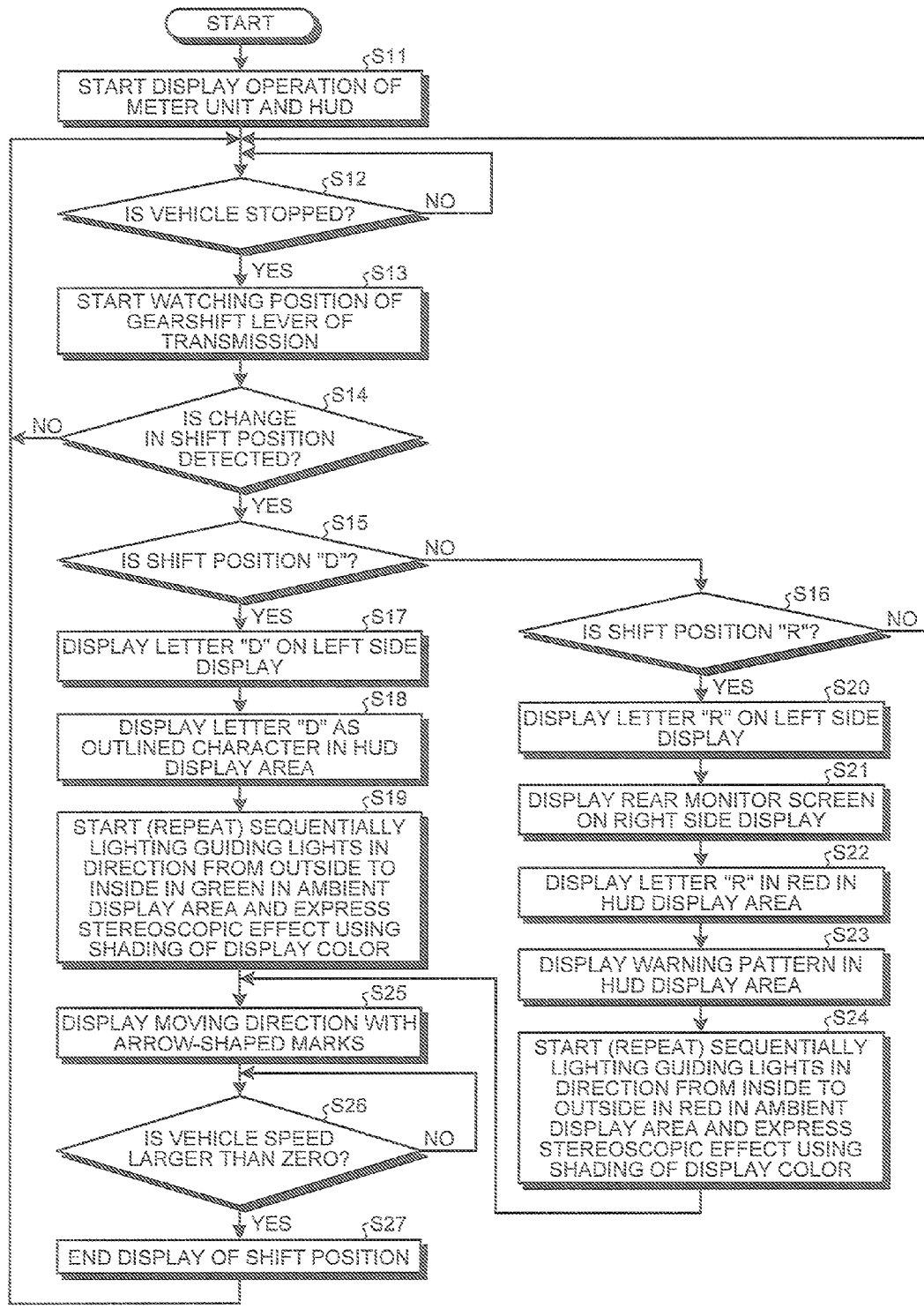
FIG. 16 is a flowchart illustrating an example of operation in relation to main control of the display unit.

FIG. 16 illustrates an operation example of main control of the display unit 10. Specifically, FIG. 16 illustrates display control in accordance with a change in shift position corresponding to a selected position of a gearshift lever (not illustrated) that operates the automatic transmission of the vehicle.

The gearshift lever of the automatic transmission is disposed at a position where the driver in the vehicle cabin can operate the gearshift lever. The driver selects shift positions such as a parking position "P", a reverse position "R", a neutral position "N", and a drive position "D" by operating the gearshift lever. For example, when the driver selects the drive position "D", the selection makes it possible to move the vehicle forward (also referred to that the shift position is changed to a forward moving state) or when the driver selects the reverse position "R", the selection makes it possible to move the vehicle backward (also referred to that the shift position is changed to a backward moving state).

Figure 17A:
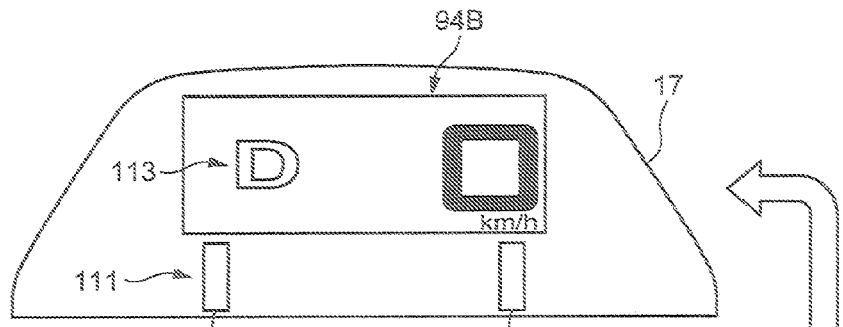
FIGS. 17A to 17C are display transition diagrams to explain the transition of a HUD display content on the combiner when a shift position is changed to a forward moving state.
Figure 17B:
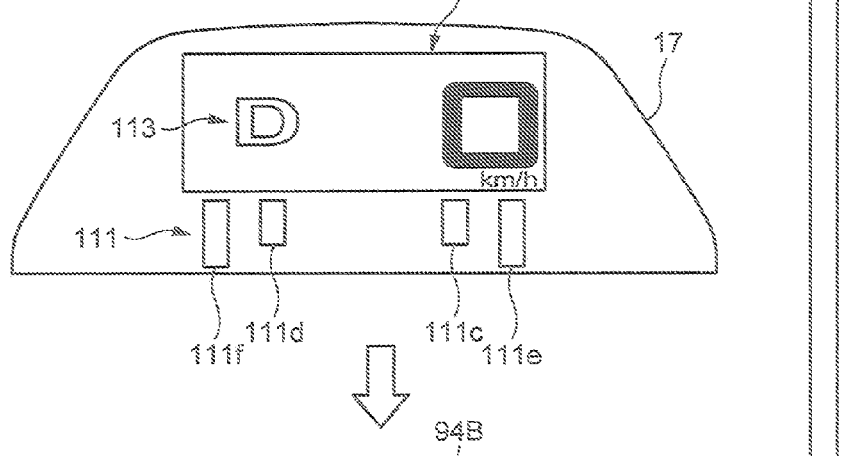
Figure 17C:
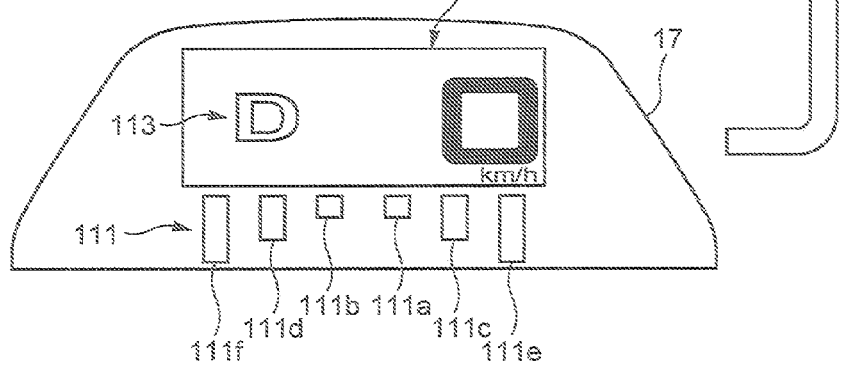
Figure 18A:
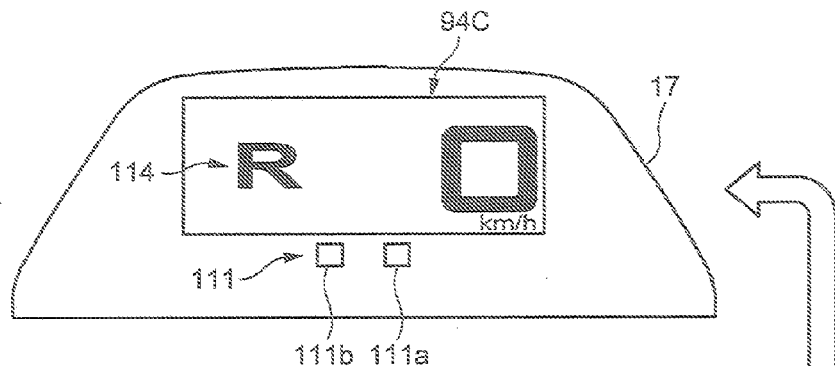
FIGS. 18A to 18C are display transition diagrams to explain the transition of the HUD display content on the combiner when the shift position is changed to a backward moving state.
Figure 18B:
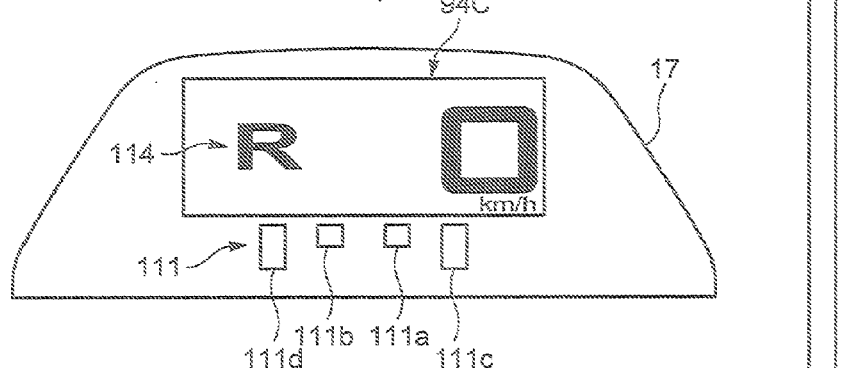
Figure 18C:
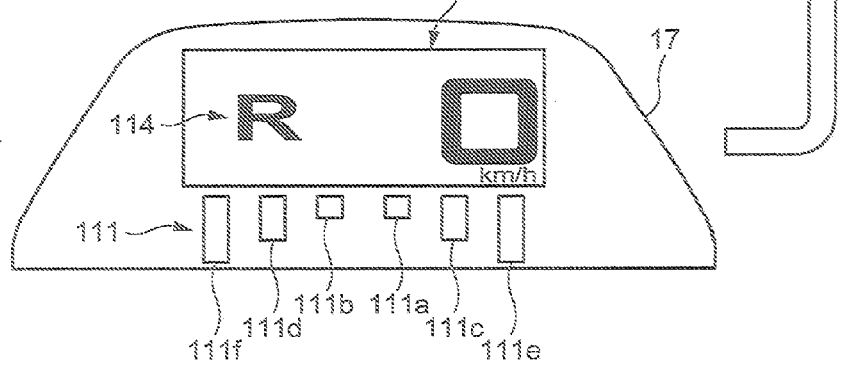

FIGS. 17A to 17C illustrate the transition of the display content on the combiner 17 when the shift position is changed to the forward moving state. FIGS. 18A to 18C illustrate the transition of the display content on the combiner 17 when the shift position is changed to the backward moving state. FIG. 19 illustrates the display contents of the display unit 10 when the shift position is changed to the forward moving state. FIG. 20 illustrates the display contents of the display unit 10 when the shift position is changed to the backward moving state. When the drive position "D" is selected, the display sequentially proceeds as follows: state (a), state (b), state (c), state (a), state (b), . . . , where the state illustrated in FIG. 17A be state (a), the state illustrated in FIG. 17B be state (b), and the state illustrated in FIG. 17C be state (c). When the reverse position "R" is selected, the display sequentially proceeds as follows: state (a), state (b), state (c), state (a), state (b), . . . , where the state illustrated in FIG. 18A be state (a), the state illustrated in FIG. 18B be state (b), and the state illustrated in FIG. 18C be state (c). The following describes the display contents illustrated in FIGS. 17A to 20 for easy understanding of the operation of the display unit 10.

[Explanation of Exemplary Displays when Shift Position is Changed]

On the display area formed on the display light reflective surface 17b of the combiner 17, a HUD display area 107 and an ambient display area 109, which are illustrated in FIGS. 19 and 20, are partitioned. The HUB display area 107 is a rectangular area that corresponds to the display content of the liquid crystal display 22g, which content is projected by the display-light projector 22. When the shift position is changed to the forward moving state, a HUB display content 94B is displayed in the HUB display area 107 as illustrated in FIGS. 17A to 17C and 19. When the shift position is changed to the backward moving state, a HUB display content 94C is displayed in the HUB display area 107 as illustrated in FIGS. 18A to 18C and 20. In both cases, a current vehicle speed (0 km/h in FIGS. 17A to 19) is displayed on the right side in the HUB display area 107. On the left side in the HUB display area 107, a current shift position is displayed by a shift position display element 113 or 114. The shift position display element 113, which indicates that the shift position is the forward moving state, is displayed in white (as an outlined character) while the shift position display element 114, which indicates that the shift position is the backward moving state, is displayed in red. The ambient display area 109 is provided under and near the HUD display area 107.

Regardless of the change in shift position, the left screen display content 91, which is the same display content as that in the normal state illustrated in FIG. 6, is displayed on the left side display 12 while the center display content 93, which is the same display content as that in the normal state illustrated in FIG. 6, is displayed on the center display 14. On the right side display 13, the right screen display content 92, which is the same display content as that in the normal state illustrated in FIG. 6, is displayed when the shift position is changed to the forward moving state while when the shift position is changed to the backward moving state, an image of the rear of the vehicle taken by the vehicle-mounted camera 97B is displayed as a right screen display content 92C as illustrated in FIG. 20. The timing at which the display is changed is described later.

In the ambient display area 109, the respective six guide lights 111a to 111f, which are illustrated in FIGS. 19 and 20, are displayed as a result of turning on the respective corresponding six light sources 28a to 28f included in the ambient light source 28 illustrated in FIG. 11.

For example, a light ray emitted from the light source 28a is projected on the combiner 17 through the prism 29a. As a result, the light source 28a is displayed on the right end side in the ambient display area 109 as the guiding light 111a, which is a virtual image. Likewise, the light sources 28b to 28f are displayed in the ambient display area 109 side by side as the guide lights 111b to 111f, which are virtual images.

More specifically, light emitted from the pair of the light sources 28a and 28b form a pair of guide lights 111a and 111b, which are displayed side by side at positions adjacent to the lower side in the HUB display area 107. Light emitted from the pair of light sources 28c and 28d form a pair of guide lights 111c and 111d displayed such that the guiding light 111c is outside the guiding light 111a and the guiding light 111d is outside the guiding light 111b. Light emitted from the pair of light sources 28e and 28f form a pair of guide lights 111e and 111f displayed such that the guiding light 111e is outside the guiding light 111c and the guiding light 111f is outside the guiding light 111d. In the embodiment, the guide lights 111a, 111c, and 111e are displayed side by side in the right direction and the respective lengths in the top-bottom direction become shorter from the guide lights 111e to the 111a while the guide lights 111b, 111d, and 111f are displayed side by side in the left direction and the respective lengths in the top-bottom direction become shorter from the guide lights 111f to the 111b. In the embodiment, as described above, the optical path lengths from the respective light sources to the eye point become shorter in the order of the pair of guide lights 111a and 111b, 111c and 111d, and 111e and 11f. As a result, the pair of guide lights 111a and 111b, 111c and 111d, and 111e and 111f are visually recognized as if the respective pairs are positioned from the rear side to the front side in this order when viewed from the driver.

[Explanation of Processing Illustrated in FIG. 16]

The following describes the processing illustrated in FIG. 16. The processing illustrated in FIG. 16 may be executed by the main controller 51 or the sub-controller 52 of the meter unit 11 or by the controller 81 of the HUD device 16. In the following description, the processing is executed by the main controller 51.

The processing illustrated in FIG. 16 is executed when an ignition switch of the vehicle is turned on, i.e., when the engine is started, for example.

At step S11, the display operations of the meter unit 11 and the HUD device 16 are started by the control of the main controller 51. Specifically, the main controller 51 controls the left side display 12, the right side display 13, and the center display 14 such that they are in a displayable state, and displays information indicating the states of respective units such as the speedometer, the fuel indicator, and the shift position of the transmission, on the screen of the left side display 12. The indications such as for warnings are mainly displayed on the center display 14. In the HUD device 16, the main controller 51 drives the electrical motor 84 to move the combiner 17 to the position where the combiner 17 protrudes above the instrument panel, which is the position in the use state. The main controller 51 starts the display of the liquid crystal display 22g of the display-light projector 22 and starts projecting, on the combiner 17, the display light of the display image displayed on the screen of the liquid crystal display 22g.

At step S12, the main controller 51 identifies whether the vehicle is stopped. Specifically, the main controller 51 acquires information about a current vehicle speed that is displayed by the speedometer, and determines that the vehicle is stopped if the vehicle speed is equal to or smaller than a predetermined threshold (e.g., 1 km/h) while the main controller 51 determines that the vehicle is not stopped if the vehicle speed exceeds the threshold. If it is detected that the vehicle is stopped, the processing proceeds to step S13.

At step S13, the main controller 51 starts monitoring the shift position. Specifically, the main controller 51 acquires the information about the current shift position to grasp the current shift position. If a change in shift position is detected, the processing proceeds from step S14 to step S15.

At step S15, the main controller 51 identifies whether the current shift position after the change is the drive position "D". If the current shift position is "D", the processing proceeds to step S17 while if the current shift position is other than "D", the processing proceeds to step S16.

At step S16, the main controller 51 identifies whether the current shift position after the change is the reverse position "R". If the current shift position is "R", the processing proceeds to step S20 while if the current shift position is other than "R", the processing returns to step S12.

At step S17, the main controller 51 controls the display content of the meter left display 36L such that the current shift position of the transmission is displayed on the screen of the left side display 12 as the letter "D".

At step S18, the main controller 51 controls the display content of the liquid crystal display 22g such that the letter "D", which indicates the current shift position of the transmission, is displayed as an outlined character on the screen projected on the combiner 17. As a result, as illustrated in FIGS. 17A to 17C and 19, a letter "D" is displayed in the HUD display area 107 as the shift position display element 113.

At step S19, the main controller 51 notifies the driver of the shift position being selected that can move the vehicle forward using the ambient display area 109 on the combiner 17.

Specifically, the main controller 51 controls the turning-on states of the light sources 28a to 28f of the ambient light source 28 illustrated in FIG. 11 such that the six guide lights 111a to 111f are lighted so as to repeat state (a), state (b), state (c), state (a), state (b), . . . , as illustrated in FIGS. 17A to 17C.

More specifically, only the pair of guide lights 111e and 111f, which are outermost, are lighted in state (a), then the pair of guide lights 111c and 111d, which are inside the guide lights 111e and 111f, are lighted in state (b), and thereafter the pair of guide lights 111a and 111b, which are innermost, are lighted in state (c). Then, the guide lights 111a to 111f are turned off once. Only the pair of guide lights 111e and 111g, which are outermost, are then lighted again in state (a). Thereafter, the display content sequentially proceeds to state (b), state (c), and so on.

To indicate that the shift position is changed to the forward moving state, the respective guide lights 111a to 111f are lighted in green. As described in later, they are lighted in red when that the shift position is changed to the backward moving state.

In addition, the lighting states are controlled such that the stereoscopic effect of the guide lights is emphasized using shading of the display color. Specifically, when the guide lights 111a to 111f are displayed in the ambient display area 109, the shading of the display color is changed between the adjacent guide lights, i.e., between the guide lights 111a and 111c, and between the guide lights 111c and 111e. The difference in shading of the display color expresses the difference in display position in the rear direction, thereby further emphasizing the stereoscopic effect. The adjacent guide lights 111b and 111d, and 111d and 111f are also displayed in the same manner as described above.

At step S19, the main controller 51 controls the turning-on state of the end face light source 46 such that the end face light source 46 blinks. As a result, illumination light of the end face light source 46 are incident on the illumination light incident section 17a of the combiner 17, reflected by the illumination light reflecting part 17c at the edge of the combiner 17, and then travel toward the driver. The driver, thus, can be aware of the notification of the change in shift position by visually recognizing the state where the edges of the combiner 17 are brightly lighted.

At step S20, the main controller 51 controls the display content of the meter left display 36L such that the current shift position of the transmission is displayed on the screen of the left side display 12 as the letter "R".

At step S21, the main controller 51 displays a back monitor screen on the right side display 13 as a right screen display content 92C as illustrated in FIG. 20. The main controller 51 performs the control such that an image of the rear of the vehicle taken by the vehicle-mounted camera 97B is displayed on the screen of the meter right display 36R. When driving the vehicle backward, the driver can check obstacles behind the vehicle on the basis of the images displayed on the right side display 13, for example.

At step S22, the main controller 51 controls the display content of the liquid crystal display 22g such that a letter "R", which indicates the current shift position of the transmission, is displayed in red on the screen projected on the combiner 17. As a result, the shift position display element 114 is displayed as the letter "R" in red in the HUD display area 107 in state (a), state (b), and state (c) of FIGS. 19A to 19C.

At step S23, the main controller 51 displays a predetermined visually recognizable warning pattern (not illustrated) on the HUD display screen in order to better warn the driver that the shift position has changed to the backward moving state. For example, a pattern of "!", which is a symbol of an exclamation mark, is largely displayed in the HUD display area 107. As a result, the warning pattern makes it possible for the driver to instantly grasp that attention needs to be paid.

At step S24, the main controller 51 notifies the driver of the shift position being selected that can move the vehicle backward using the ambient display area 109 on the combiner 17.

Specifically, the main controller 51 controls the turning-on states of the light sources 28a to 28f of the ambient light source 28 illustrated in FIG. 11 such that the six guide lights 111a to 111f are lighted so as to repeat state (a), state (b), state (c), state (a), state (b), . . . , as illustrated in FIGS. 18A to 18C.

More specifically, only the pair of guide lights 111a and 111b, which are innermost, are lighted in state (a), then the pair of guide lights 111c and 111d, which are outside the guide lights 111a and 111b, are lighted in state (b), and thereafter the pair of guide lights 111e and 111f, which are outermost, are lighted in state (c). Then, the guide lights 111a to 111f are turned off once. Only the pair of guide lights 111a and 111b, which are innermost, are then lighted again in state (a). Thereafter, the display content sequentially proceeds to state (b), state (c), and so on.

To indicate that the shift position is changed to the backward moving state, the respective guide lights 111a to 111f are lighted in red. In the same manner as the case where the shift position is changed to the forward moving state, the lighting states are controlled such that the stereoscopic effect of the guide lights is emphasized using shading of the display color. Specifically, when the guide lights 111a to 111f are displayed in the ambient display area 109, the shading of the display color is changed between the adjacent guide lights. In addition, the turning-on state of the end face light source 46 is controlled such that the end face light source 46 blinks.

At step S25, the main controller 51 displays an arrow-shaped mark indicating the moving direction of the vehicle near the guide lights 111a to 111f in order to enable the driver to recognize the moving direction of the vehicle. For example, when the current shift position is "D", a pair of arrow-shaped marks 115, each of which indicates a direction from outside toward inside, are displayed under the guide lights 111a to 111f as illustrated in FIG. 19. When the current shift position is "R", a pair of arrow-shaped marks 116, each of which indicates a direction from inside toward outside, are displayed under the guide lights 111a to 111f as illustrated in FIG. 20.

At step S26, the main controller 51 monitors the vehicle speed and identifies whether the vehicle starts moving on the basis of the monitored vehicle speed. If it is determined that the vehicle starts moving, the processing proceeds to step S27.

At step S27, the main controller 51 performs the control such that the display of the shift position on the HUD screen ends. Specifically, when the shift position is "D", the letter "D" displayed in the HUD display area 107 at step S18 is erased and all of the guide lights 111a to 111f in the ambient display area 109 are turned off. When the shift position is "R", the display of the rear monitor screen on the right side display 13 is cancelled, the letter "R" displayed in the HUD display area 107 at step S22 is erased, and all of the guide lights 111a to 111f in the ambient display area 109 are turned off.

As a result of the processing executed as described above, the display content changes as illustrated in FIGS. 17A to 20. In the HUD device 16 of the embodiment, the lighting states of the guide lights 111a to 111f change when the shift position of the transmission is changed, thereby making it possible for the driver to grasp the current shift position on the basis of the lighting states. In addition, the HUD device 16 displays such displays, thereby making it possible for the driver to grasp the current shift position without significantly moving the sight line from that in the normal driving state. Furthermore, such displays are lighted on the combiner 17, thereby making it easy for the driver to be aware of the displays.

In the HUD device 16 in the embodiment, when the shift position is changed to the forward moving state, second guide lights (e.g., the guide lights 111c and 111d) are lighted and thereafter first guide lights (e.g., the guide lights 111a and 111b), which are disposed inside the second guide lights, are lighted. In contrast, when the shift position is changed to the backward moving state, the first guide lights are lighted and thereafter the second guide lights disposed outside the first guide lights are lighted. In this way, the change in shift position corresponds to the lighting direction of the guide lights, thereby making it possible for the driver to grasp the current shift position on the basis of the lighting direction of the guide lights.

In the HUD device 16 in the embodiment, the optical path length (D1) of first light sources (e.g., the light sources 28a and 28b) disposed inside on the substrate is larger than the optical path length (D2) of second light sources (e.g., the light sources 28c and 28d) disposed outside on the substrate. As a result, the driver visually recognizes that the first guide lights (e.g., the guide lights 111a and 111b) disposed inside are further located in the rear direction than the second guide lights (e.g., the guide lights 111c and 111d) disposed outside. In other words, the driver visually recognizes that the first guide lights are located ahead the second guide lights in the traveling direction of the vehicle. In this structure, when the first light sources are turned on after the second light sources are turned on, the first guide lights are lighted after the second guide lights are lighted. As a result, the positions where the guide lights, which are the viewing targets of the driver, are formed move from the rear side to the front side in the traveling direction of the vehicle, causing the driver to recognize the direction from the rear side toward the front side. This structure thus makes it possible to cause the driver to recognize that the direction is coincident with the forward moving direction, which is the movement direction of the vehicle. When the second light sources are turned on after the first light sources are turned on, the second guide lights are lighted after the first guide lights are lighted. As a result, the positions where the guide lights, which are the viewing targets of the driver, are formed move from the front side to the rear side, causing the driver to recognize the direction from the front side to the rear side. This structure thus makes it possible to cause the driver to recognize that the direction is coincident with the backward movement direction, which is the movement direction of the vehicle. In this way, the change in shift position corresponds to the change in positions where the guiding lightings are formed, thereby making it possible for the driver to grasp the current shift position on the basis of the change in positions where the guide lights are formed.

The HUD device 16 in the embodiment makes it possible for the driver to differentiate the shift position in the forward moving state and the shift position in the backward moving state, besides the moving directions of the displays of the guide lights 111a to 111f, on the basis of the following: the difference in display color (green or red) of the guide lights 111a to 111f, the difference in shading of the display color, the difference in display between the shift position display elements 113 and 114 and the difference in display color (white (outlined character) or red) between the shift position display elements 113 and 114, which elements are displayed in the HUD display area 107, and the difference between the directions indicated by the arrow-shaped marks 115 and 116. In addition, the end face light source 46 is turned on when the shift position is changed and the edges of the combiner 17 are thus lighted, thereby making it possible for the driver to be aware of the change in shift position. Furthermore, the warning pattern displayed on the HUD display screen at step S23 also makes it possible for the driver to be aware of the shift position being changed to the backward moving state.

In the display unit 10 in the embodiment, the rear monitor screen is displayed on the right side display 13 when the shift position is changed to the backward moving state. When driving the vehicle backward, the driver can check obstacles behind the vehicle on the basis of the images displayed on the right side display 13, for example.

The following summarizes the HUD device 16 and the display unit 10 in the embodiment.

(1) The HUD device 16 in the embodiment is used by being mounted on a vehicle. The HUD device 16 includes the display-light projector 22 (projector) that projects display light including a display image on the combiner 17 (reflecting plate), a pair of first light sources (the light sources 28a and 28b) and a pair of second light sources (the light sources 28c and 28d) that emit light and project the emitted light on the combiner 17, and the main controller 51 (controller) that is connected to the first light sources and the second light sources. Display light from the display-light projector 22 are reflected by the combiner 17 in the viewing direction (toward the eye point). As a result, the HUD display area 107 (display area) is partitioned on the combiner 17. Light emitted from the first light sources are reflected by the combiner 17 in the viewing direction. As a result, a pair of first guide lights (the guide lights 111a and 111b) are displayed side by side at positions near the HUD display area 107 on the combiner 17. Light emitted from the second light sources are reflected by the combiner 17 in the viewing direction. As a result, a pair of second guide lights (the guide lights 111c and 111d) are displayed outside the first guide lights such that the pair of second guide lights are interposed between the pair of first guide lights. The main controller 51 controls the turning-on states of the first light sources and the second light sources such that at least one of the numbers of light sources to be lit, lighting cycle, and lighting order of the first light sources and the second light sources is changed in accordance with the change in shift position of the transmission of the vehicle.

(2) In the HUD device 16 in the embodiment, the main controller 51 turns on the second light sources and thereafter turns on the first light sources when the shift position is changed to the forward moving state while the main controller 51 turns on the first light sources and thereafter turns on the second light sources when the shift position is changed to the backward moving state.

(3) In the HUD device 16 according to the embodiment, the optical path length (D1) from the combiner 17 to the first light sources is larger than the optical path length (D2) from the combiner 17 to the second light sources in the viewing direction.

The technical scope of the invention is not limited to the embodiment described above. Various changes and modifications of the embodiment can be made within the technical scope of the invention.

In the display examples illustrated in FIGS. 17A to 18C, the displays are changed in such a manner that the number of lighted guide lights sequentially increases. For example, the displays may be changed in such a manner that the guide lights are sequentially lighted on a pair by pair basis such that the position of the pair of lighted guide lights moves from outside to inside or from inside to outside. Alternatively, the displays may be changed in such a manner that the guide lights are turned off from a state where all of the six guide lights 111a to 111f are lighted on a pair by pair basis such that the position of the pair of turned-off guide lights moves from outside to inside or from inside to outside.

In the embodiment, the reflective surface of the combiner 17 is used for the HUD display. Instead of the combiner 17, a part of the front windshield of the vehicle may also be used as a substitute of the reflective surface of the HUD device, for example.

In the head-up display device according to one aspect of the present invention, the lighting states of the first and the second guide lights change when the shift position of the transmission is changed, thereby making it possible for the driver to grasp the current shift position on the basis of the lighting states. In addition, the head-up display device displays such displays, thereby making it possible for the driver to grasp the current shift position without significantly moving the sight line from that in the normal driving state. Furthermore, such displays are lighted on the reflecting plate, thereby making it easy for the driver to be aware of the displays.

In the head-up display device according to another aspect of the present invention, when the shift position is changed to the forward moving state, the second guide lights disposed outside are lighted and thereafter the first guide lights disposed inside the second guide lights are lighted. When the shift position is changed to the backward moving state, the first guide lights are lighted and thereafter the second guide lights are lighted. In this way, the change in shift position corresponds to the lighting direction of the guide lights, thereby making it possible for the driver to grasp the current shift position on the basis of the lighting direction of the guide lights.

In the head-up display device according to still another aspect of the present invention, the optical path length of the first light source is larger than the optical path length of the second light source. As a result, the driver visually recognizes that the first guide lights are located behind the second guide lights. In other words, the driver visually recognizes that the first guide lights are located ahead of the second guide lights in the traveling direction of the vehicle. In this structure, when the first light sources are turned on after the second light sources are turned on, the first guide lights are lighted after the second guide lights are lighted. As a result, the positions where the guide lights, which are the viewing targets of the driver, are formed move from the rear side to the front side in the traveling direction of the vehicle, causing the driver to recognize the direction from the rear side to the front side. This structure thus enables the driver to recognize that the direction is coincident with the forward moving direction, which is the movement direction of the vehicle. When the second light sources are turned on after the first light sources are turned on, the second guide lights are lighted after the first guide lights are lighted. As a result, the positions where the guide lights, which are the viewing targets of the driver, are formed move from the front side to the rear side in the traveling direction of the vehicle, causing the driver to recognize the direction from the front side to the rear side. This structure thus enables the driver to recognize that the direction is coincident with the backward moving direction, which is the movement direction of the vehicle. In this way, the change in shift position corresponds to the change in positions where the guiding lightings are formed in the traveling direction, thereby making it possible for the driver to grasp the current shift position on the basis of the change in positions where the guide lights are formed.

The head-up display device of the present invention has an advantage of allowing the driver to readily grasp the current shift position.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-up display device for mounting on and for use with a vehicle, comprising:
   a projector configured to project display light including a display image onto a reflecting plate;
   a pair of first light sources and a pair of second light sources configured to project emitted light onto the reflecting plate; and
   a controller connected to the first light sources and the second light sources, wherein the display light from the projector is reflected by the reflecting plate in a viewing direction to define a display area on the reflecting plate,
   the emitted light from the first light sources is reflected by the reflecting plate in the viewing direction to display a pair of first guide lights side by side adjacent to the display area on the reflecting plate,
   the emitted light from the second light sources is reflected by the reflecting plate in the viewing direction to display a pair of second guide lights at outer sides of the respective first guide lights on the reflecting plate,
   the controller controls lighting states of the first light sources and the second light sources to change at least one of a number of light sources to be lit, lighting cycle, and lighting order of the first light sources and the second light sources in accordance with a change in shift position of a transmission of the vehicle so that the first light sources have a lighting state that is different from a lighting state of the second light sources, and
   the controller turns on the second light sources and thereafter turns on the first light sources when the shift position is changed to a forward moving state, while the controller turns on the first light sources and thereafter turns on the second light sources when the shift position is changed to a backward moving state.

2. The head-up display device according to claim 1, wherein
   an optical path length from the reflecting plate to the first light sources is larger than an optical path length from the reflecting plate to the second light sources.

* * * * *